United States Patent [19]

Schindler et al.

[11] 4,190,996
[45] Mar. 4, 1980

[54] CORNERS OF STRUCTURAL MEMBERS

[75] Inventors: Rudolf Schindler, Ottobrunn; Werner Hartmann, Munich, both of Fed. Rep. of Germany

[73] Assignee: Messerschmitt-Bolkow-Blohm GmbH, Munich, Fed. Rep. of Germany

[21] Appl. No.: 860,180

[22] Filed: Dec. 13, 1977

[30] Foreign Application Priority Data

Dec. 18, 1976 [DE] Fed. Rep. of Germany ....... 2657542

[51] Int. Cl.² .............................................. E04C 2/22
[52] U.S. Cl. ................................... 52/309.13; 52/656; 244/131; 428/113; 428/902
[58] Field of Search ............... 428/105, 107, 108, 109, 428/110, 111, 112, 113, 902, 101, 119, 120, 124, 128, 366, 367, 373, 397, 399; 403/402, 403; 52/729, 732, 656, 309.13, 284

[56] References Cited
U.S. PATENT DOCUMENTS

| | | | |
|---|---|---|---|
| 3,726,751 | 4/1973 | Casadevall | 428/113 |
| 3,959,544 | 5/1976 | Rogers | 428/109 |
| 4,020,202 | 4/1977 | Kreft | 428/902 |
| 4,048,360 | 9/1977 | Jonda | 52/731 |

*Primary Examiner*—John E. Murtagh
*Attorney, Agent, or Firm*—Toren, McGeady and Stanger

[57] ABSTRACT

The corner of a structural member has first, second, third and fourth surfaces which converge to form the corner with first, second and third layers of fiber reinforced material successively applied to the corner surfaces to form the walls of the corner. The first layer of fiber reinforced material completely covers the first and second surfaces and partially covers the third and fourth surfaces. The second layer completely covers the second and fourth surfaces and that part of the third surface which remained uncovered by the first layer, and the third layer completely covers the first and third surfaces and that part of the fourth surface which remained uncovered by the first layer. The three layers arranged in this manner therefore produces corner walls having a thickness corresponding to two of the layers. The fibers in the two layers forming the walls extend in directions transverse to each other and form patterns different from each other.

7 Claims, 2 Drawing Figures

U.S. Patent  Mar. 4, 1980  Sheet 1 of 2  4,190,996
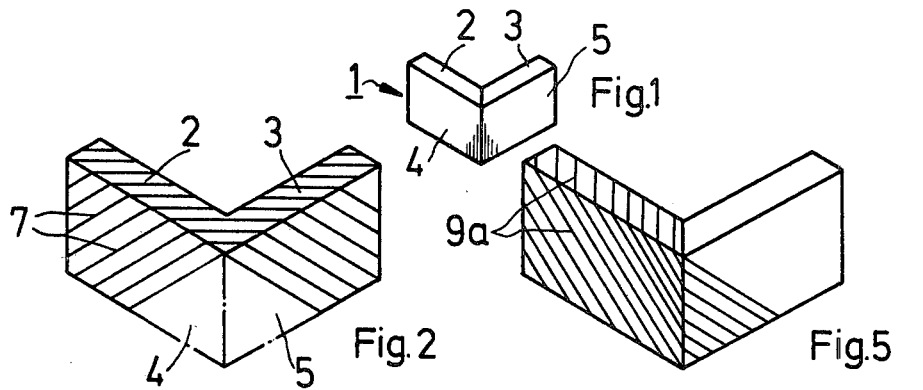
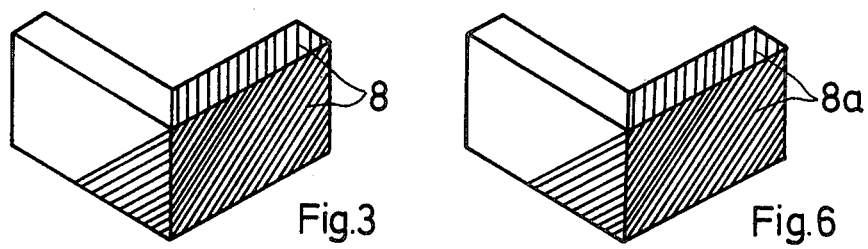
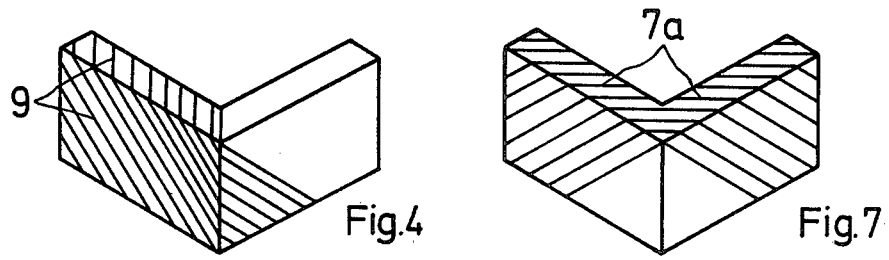
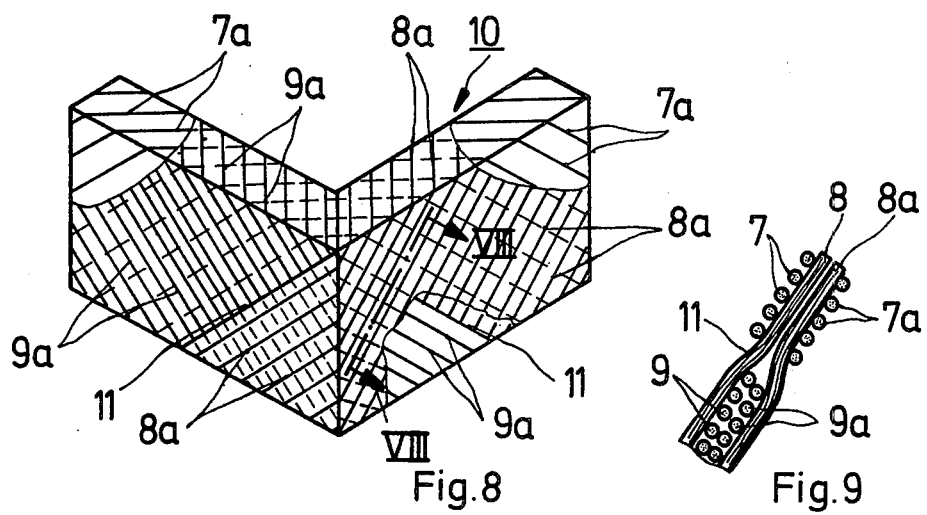

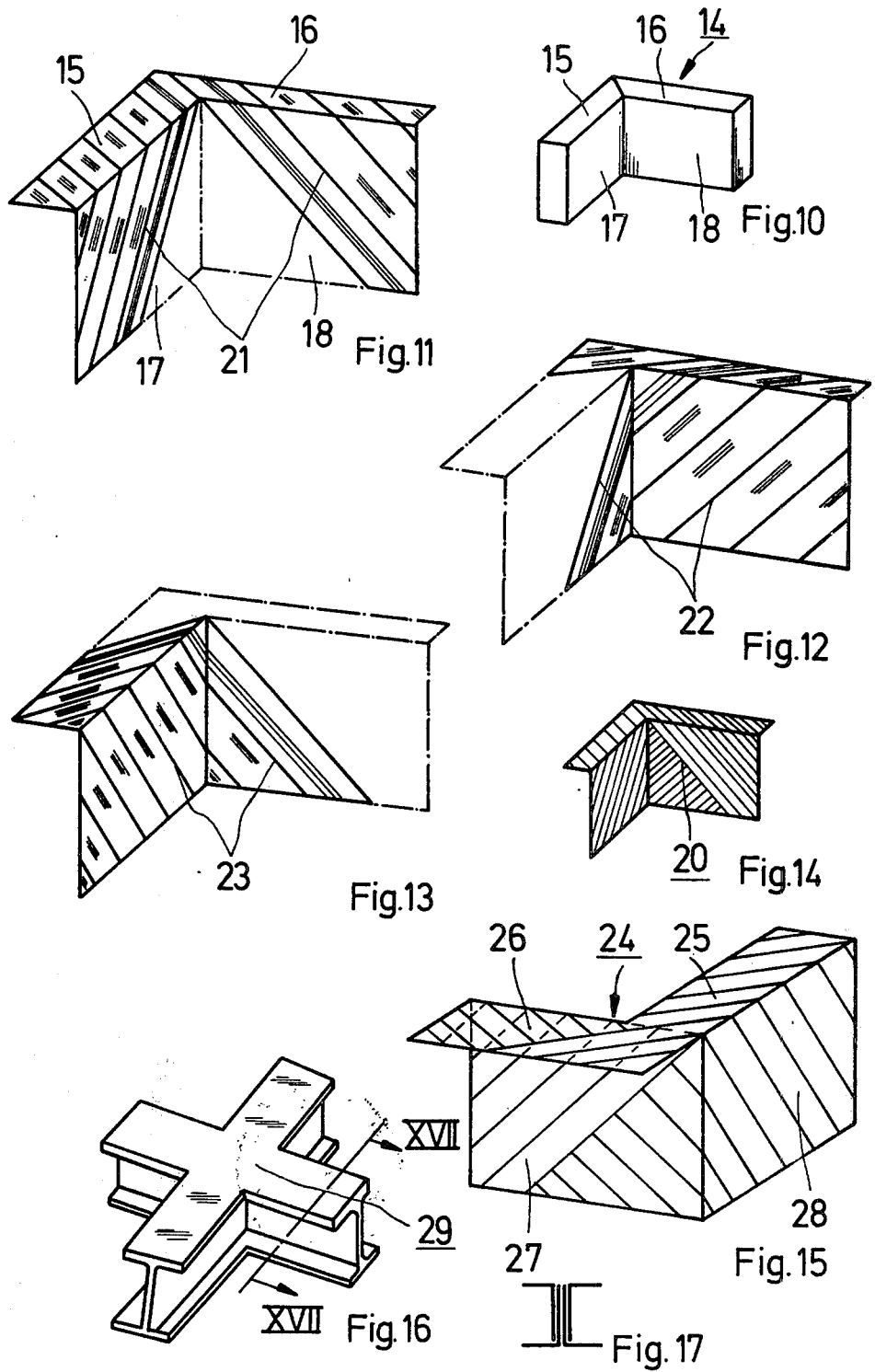

CORNERS OF STRUCTURAL MEMBERS

BACKGROUND OF THE INVENTION

The present invention relates to the construction of corners for structural members made of fiber reinforced material, and which are formed by four surfaces arranged at angles with respect to each other that converge to form the corner.

Boxes, frames, flanges or other structural members which are made by laminating materials have corners which are formed by overlapping the laminations. Shoulders, bulges, steps and recesses which result from overlapping the laminations cause interference when several corners are fitted into each other are joined together. In addition, overlapping the laminations increases the weight of the corners and interferes with the flux pattern or path of forces within the structural member. It is also desirable that the fibers of the fiber reinforced materials form well defined fiber patterns and symmetrical patterns between the layers. This will ensure that the various parts made from the fiber reinforced materials will retain their shape during a hardening process. This requirement cannot be easily met when structural members are formed by overlapping laminations because stresses and deformations are likely to occur in the thickened areas of the overlapped laminations when the members cool after a hardening process at an elevated temperature. In structural members which have corners or other areas made of overlapped laminations, it is necessary to use more layers of the fiber material, to avoid the undesirable stresses and deformations, than are normally required for the strength of the member.

It is accordingly an object of the present invention to provide corners of structural elements made of fiber reinforced materials which avoid the disadvantages of corners made by overlapping laminations.

A more specific object of the present invention is to provide a construction for the corners of structural members made of fiber reinforced materials which have absolutely smooth surfaces and uniform wall thicknesses while still making the best use of the properties of the fiber reinforced material.

Other objects, features and advantages of the present invention will become more apparent from the description of the invention in connection with the annexed drawings to be described more fully hereinafter.

SUMMARY OF THE INVENTION

The foregoing objects of the present invention are generally accomplished by providing a corner for a structural member made of fiber reinforced material which has first, second, third and fourth surfaces that converge to form the corner, and first, second and third layers of fiber material which cover each of the corner forming surfaces. The first layer is arranged to completely cover the first and second surfaces and partially cover the third and fourth surfaces. The second layer is arranged so as to completely cover the second and fourth surfaces and that part of the third surface which remained uncovered by the first layer, and the third layer is arranged so as to completely cover the first and third surfaces and that part of the fourth surface which remained uncovered by the first layer.

The application of three layers of fiber material in accordance with the foregoing arrangement produces corner walls having a thickness corresponding to two of the layers since certain parts of the surfaces were not completely covered by each layer.

Structural members which are constructed in this manner have wall thicknesses for each of the surfaces which are uniform and which have layers of reinforced fiber material which do not interfere with the flux pattern of forces through the member from one layer of fiber material to the other. An additional advantage of this construction is the that the method of producing these corners for structural members can be simplified to ensure reproducible unidirectional application of the fibers. The corners of the structural members made in accordance with the present invention are therefore capable of taking the most advantage of the various desirable properties of each of the fiber reinforced materials used.

The present invention also permits corners of structural members to be made of any shape with the angle between adjacent surfaces chosen in accordance with geometric conditions and requirements of the member. By arranging the fibers of each layer to extend in a manner symmetrical to a line bisecting the angle between two of the surfaces facilitates forming identical fiber layers symmetrical to the angle bisector in the surfaces of the corner. By arranging the fibers of the layers in this manner, none of the fibers of the structural member have to be cut.

In one embodiment of the invention where the various surfaces of the corner form angles of 90° with respect to each other, the layers of fiber material are applied to the surfaces so that the fibers are arranged at an angle of 45° with respect to the edges of the intersecting surfaces of the corner. This embodiment of the invention simplifies construction of rectangular boxes, frames, structural profiles, etc. As a result, the rectangular boxes or other structural members have smooth surfaces over the entire surface of the member including the corners and therefore a relatively lower weight.

While a wall thickness of two layers (formed by three layers of fiber material) is sufficient for corners of structural members to which little load is applied, a wall thickness of four layers, formed by the application of six layers of fiber material in accordance with the present invention, should be used for the production of structural members which are shear resistant and which are to be rigidly fastened to other bodies. Because of the crosswise arrangement of the fibers in the different layers and the pattern of the layers applied to the surfaces to enhance the strength of the structural members, corners having a thickness of four layers are sufficient for producing shear resistant structural members to which a high load may be applied. The actual strength of the members and of the corners of the members can also be affected and varied by the type of material used.

A further advantageous feature of the present invention is to provide that all the fibers of the individual layers are arranged parallel with each other, that the fiber reinforced material consists of fibers impregnated with synthetic resin, the fibers being pre-impregnated or being impregnated with synthetic resin during application, and that the reinforcing fibers of each layer can be either made of glass, carbon, boron, plastic or other fiber material.

Therefore, depending upon the particular purpose and use of the structural member, and depending upon the intensity of forces to be applied to the structural member, all known fiber reinforced materials may be used to form the corners of the structural members in accordance with the present invention. In order to construct the structural members noted above, by using corners made in accordance with the present invention, the structural members may be provided with inner and outer boundary surfaces. In addition, because the corner elements made in accordance with the present invention have smooth and uniform surfaces, they may be joined in a variety of arrangements to form different kinds of profiles. This is particularly advantageous when it is desired to reproducibly manufacture a particular profile.

BRIEF DESCRIPTION OF THE DRAWINGS

Further features of the invention will be apparent from the description of the invention in connection with the following drawings, in which:

FIG. 1 illustrates in perspective view a pattern or form of one embodiment of the corner upon which the various layers are to be applied;

FIG. 2 illustrates the application of a first layer of fiber material upon the form shown in FIG. 1;

FIGS. 3 through 7 illustrate the application of further layers of fiber reinforced material to be applied to the form shown in FIG. 1 and over the layer illustrated in FIG. 2;

FIG. 8 illustrates the arrangement of a corner constructed by the application of each of the layers shown in FIGS. 2-7;

FIG. 9 is an enlarged cross sectional view taken along lines VIII—VIII of FIG. 8 showing the arrangement of fibers in the corner of the structural member shown in FIG. 8;

FIG. 10 illustrates in perspective view a pattern or form of a second embodiment of a corner of a structural member upon which layers of fiber material is to be applied;

FIGS. 11 through 13 illustrate three separate layers of fiber material to be applied to the form shown in FIG. 10;

FIG. 14 illustrates a corner of a structural member made by successively applying each of the layers shown in FIGS. 11-13 respectively;

FIG. 15 illustrates a third embodiment of a corner for a structural member;

FIG. 16 is a perspective view illustrating a profile in the shape of a cross assembled from different corners made in accordance with the present invention; and FIG. 17 is a sectional view taken along the lines XVII—XVII of FIG. 16.

DESCRIPTION OF THE INVENTION

Referring now to the accompanying drawings, FIG. 1 shows the pattern or form 1 upon which the various layers of fiber reinforced material is to be applied to form the corner of the present invention. The form 1 has four angle forming surfaces 2, 3, 4 and 5 which converge to form the shape of a corner of a structural member in which the corner will be used. The embodiment shown in FIGS. 1-9 provides that the angles between the various surfaces of the corner are 90°, which is the usual and typical construction of most structural members or profiles which have corners. However, it is possible to form corners of structural members in which the various surfaces of the corners are arranged at angles other than 90°. Also, while the present invention illustrates surfaces 2 and 3 arranged in the same plane, these surfaces can be arranged at an angle with respect to each other. This may be necessary for certain applications, such as for example for rib girders used in the construction of certain aircraft. Regardless of the particular shape of the corner, however, a form such as form 1 illustrated in FIG. 1 must be prepared upon which the various layers will be applied.

FIGS. 2, 3 and 4 illustrate the arrangement of three separate layers of fiber material which are to be applied to the form. Each of these figures illustrate the orientation of the fibers in each layer, however, it will be appreciated that the arrangement of the fibers shown herein is for purposes of clarity and understanding the invention. In reality, the fibers in each layer are positioned closely to each other as is well known when using such materials. It will also be appreciated from viewing FIGS. 2-4 that form 1 will be completely covered after applying only two of the layers to the form. It will also be appreciated that after all three layers are applied the composite layered structure will have a uniform thickness equal to two of the layers. This is due to the fact that certain parts of each surface are not covered by each layer.

A first fiber reinforced layer 7, shown in FIG. 2, having the fiber orientation illustrated, will first be applied to form 1 completely covering surfaces 2 and 3 and covering most of the surfaces 4 and 5. The second fiber layer 8, having the fiber orientation shown in FIG. 3, is then applied to the form on top of the first layer thus completely covering surfaces 3 and 5 and that part of surface 4 which was not covered by the first layer 7. The fibers of layer 8 extend at a right angle with the fibers of layer 7. The third layer 9, shown in FIG. 4, is then applied to the form on top of layers 7 and 8. Layer 9 completely covers surfaces 2 and 4 and that part of surface 5 which was not covered by layer 7. Form 1 is thus completely covered by the three layers. Because the three layers do not cover all areas of each surface, the wall thickness of the corner will be uniformly two layers thick. From FIGS. 2-4 it will be seen that the second layer of fiber material has fibers which cross the fibers of the first layer at a right angle to produce a corner element having substantial strength. The various layers are applied to the form 1 in a known manner, such as for example by wet lamination or by using preimpregnated fibers or rovings and by depositing the rovings in the desired manner. The layers of fiber material are then pressed against the form, the excess resin in the material is then removed, the applied layers of fiber material are subsequently hardened, and then the hardened layers are removed from the form for use as a corner in a structural member. These methods of applying the layers are known and for example are described on pages 539 to 557 in a book entitled "Glasfaserverstärkte Kunststoffe" (Glass Fiber Reinforced Plastics), edited by Peter H. Selden, Springer-Verlag, Berlin-Heidelberg-New York 1967.

To produce corners which are shear resistant and rigidly fastened for structural members to which high loads may be applied, it may be advantageous to apply three additional layers of fiber material to the form thus increasing the thickness of the corner by an additional two layers. The additional layers preferably have the shape and fiber orientation as illustrated in FIGS. 5-7. The additional layer 9a, shown in FIG. 5, is therefore arranged on top of layer 9, shown in FIG. 4, and the two additional layers 8a and 7a, shown in FIGS. 6 and 7 respectively, are successively arranged on top of layer 9a. Accordingly, the three additional layers 9a, 8a and 7a form an additional thickness of two layers thick, because each layer did not completely cover all of the parts of each surface, and together with the three layers of FIGS. 2, 3 and 4 form a composite structure having a thickness of four layers formed by the application of six layers of the fiber material shown in FIGS. 2-7.

FIG. 8 illustrates a completed corner 10 for use on a structural member having the six layers shown in FIGS. 2-7 applied thereto. Portions of the various layers have been removed for clarity so that the arrangement of the fibers underneath the individual layers can be seen and appreciated. FIG. 9 shows in enlarged cross-sectional view, the arrangement of the fibers (without showing the plastic matrix formed by the resin). It will be seen from this view in connection with FIG. 8 that the fibers of layers 7 and 7a are parallel, the fibers of layers 8 and 8a are parallel, and the fibers of layers 9 and 9a are parallel, while the fibers of layers 7, 7a are transverse to the fibers of 8,8a and 9,9a. It will also be appreciated from the cross-sectional view shown in FIG. 9 that the walls of the corner 10 have a uniform thickness even at the transitional point 11 which is the only place where the layers deflect from one layer thickness to another layer thickness.

FIG. 10 illustrates another form upon which a corner made in accordance with the present invention, can be constructed. The corner illustrated in this figure may be referred to as an "inside corner", while the corner illustrated in the embodiment shown in FIGS. 1–9 may be referred to as an "outside corner". The inside corner has two of its surfaces forming an interior angle with the other two surfaces, and the outside corner has two of its surfaces forming an exterior angle with the other two surfaces.

A corner 20 illustrated in FIG. 14 is to be formed on the form 14 by applying the three separate layers 21, 22 and 23 having the shape and fiber orientation shown in FIGS. 11–13 respectively onto the four surfaces 15, 16, 17 and 18 of the form 14. FIGS. 11, 12 and 13 illustrate only the shape of the separate individual layers and their relative fiber orientation to be applied to the form. To produce a corner having higher strength capabilities, an additional double layer thickness formed by three layers of fiber reinforced material can be applied to the completed corner 20 shown in FIG. 14. Accordingly, three additional layers corresponding to layers 23, 22 and 21 (in that order) will be applied to the first three layers.

FIG. 15 illustrates that a corner 24 having a rather unusual shape can also be made without overlapping laminations at any particular surface by arranging either three or six layers of fiber reinforced material on a form to produce a corner having a thickness of either two layers or four layers respectively. Corner 24 has an inner surface 25 and an outer surface 26 which form angles with bordering surfaces 27 and 28.

FIG. 16 illustrates a cross profile of a structural member formed by corners made in accordance with the present invention. Eight corners, such as the "outside corners" 10, will be joined along their surfaces 4 and 5 in such a manner as to form the cross profile 29. The cross profile can thus be formed in a very simple manner. Otherwise, the construction of such a structural member from fiber reinforced material is extremely complicated. The cross piece made in accordance with the present invention, however, has extremely high strength and low weight. This type of structure may for example be used as a centerpiece of two intersecting girders which are subjected to bending stresses. The cross-sectional view shown in FIG. 17 illustrates the assembly of the corners to form the cross profile.

In each of the embodiments discussed above, it is desirable to provide that all of the fibers in each of the separate layers are parallel to each other.

While the present invention has been described and illustrated with respect to various embodiments which produce satisfactory results, it will be appreciated by those skilled in the art, after understanding the purposes of the invention, that various changes and modifications may be made, without departing from the spirit and scope of the invention, and it is therefore intended to cover all such changes and modifications in the appended claims.

What is claimed is:

1. A corner of a structural member having a first wall, a second wall and a third wall, said first and second walls disposed at an angle to one another and an edge of each located at a common intersection line between said first and second walls, said third wall extending transversely of said first and second walls and of the common intersection line between said first and second walls, said third wall having one edge thereof forming a common intersection line with said first wall and another edge thereof forming a common intersection line with said second wall, the common intersection lines of said third wall with said first and second walls extend transversely of the common intersection line between said first and second walls, wherein the improvement comprises that each of said first, second and third walls are of equal wall thickness and strength and are formed of at least two fiber reinforced layers, each layer having parallel fibers extending in the same direction and the fibers in one layer extending transversely across the fibers in the adjacent layer.

2. A corner, as set forth in claim 1, wherein said fiber reinforced layers comprise fibers embedded in a synthetic resin.

3. A corner, as set forth in claim 2, wherein said fibers are formed of one of glass, carbon, boron and plastic.

4. A corner, as set forth in claim 1, wherein said first wall, said second wall and said third wall combine to form box-type corners of structural elements with said first and second walls disposed substantially perpendicularly to one another and said third wall disposed substantially perpendicularly to each of said first and second walls, said walls being planar.

5. A corner, as set forth in claim 1, wherein said first wall, said second wall and said third wall each have a first surface and an oppositely facing second surface with the first surfaces of said first and second walls forming a continuation one of the other and said second surfaces of said first and second walls forming a continuation one of the other, said third wall extends outwardly from said first and second walls in the direction in which the first surfaces of said first and second walls face.

6. A corner, as set forth in claim 1, wherein said first wall, said second wall and said third wall each have a first surface and an oppositely facing second surface with the first surfaces of said first and second walls forming a continuation one of the other and said second surfaces of said first and second walls forming a continuation one of the other, said third wall extends outwardly from said first and second walls in the direction in which the second surfaces of said first and second walls face.

7. A corner, as set forth in claim 1, wherein said first wall, said second wall and said third wall each have a first surface and an oppositely facing second surface with the first surfaces of said first and second walls forming a continuation one of the other and said second surfaces of said first and second walls forming a continuation one of the other, said third wall extends outwardly from said first wall in the direction in which the first surface thereof faces and said third wall extends outwardly from said second wall in the direction in which the second surface thereof faces.

* * * * *